US008871170B2

(12) United States Patent
Bonan et al.

(10) Patent No.: US 8,871,170 B2
(45) Date of Patent: Oct. 28, 2014

(54) POLYHALITE IMI PROCESS FOR KNO₃ PRODUCTION

(75) Inventors: Michael Bonan, Rekhasim (IL); Eyal Ginzberg, Zikhron-Yaakov (IL); Akiva Mozes, Rishon Lezion (IL); Eyal Barnea, Nesher (IL); Hugo Keselman, Carmiel (IL); Gideon Friedman, Haifa (IL); Ron Frim, Haifa Bay (IL); Cornelis Petrus Langeveld, Zuidoostbeemster (NL)

(73) Assignee: IMI TAMI Insitute for Research and Development, Haifa Bay (IL)

( * ) Notice: Subject to any disclaimer, the term of this patent is extended or adjusted under 35 U.S.C. 154(b) by 235 days.

(21) Appl. No.: 13/380,539

(22) PCT Filed: Jun. 27, 2010

(86) PCT No.: PCT/IL2010/000514
§ 371 (c)(1),
(2), (4) Date: Apr. 19, 2012

(87) PCT Pub. No.: WO2010/150266
PCT Pub. Date: Dec. 29, 2010

(65) Prior Publication Data
US 2012/0195818 A1 Aug. 2, 2012

Related U.S. Application Data

(60) Provisional application No. 61/220,230, filed on Jun. 25, 2009.

(51) Int. Cl.
| | | |
|---|---|---|
| C01D 9/00 | (2006.01) |
| C01D 9/04 | (2006.01) |
| C05C 5/02 | (2006.01) |
| C01F 5/14 | (2006.01) |
| C22B 26/10 | (2006.01) |
| C22B 3/06 | (2006.01) |
| C01F 11/46 | (2006.01) |
| C01F 5/22 | (2006.01) |
| C01D 3/04 | (2006.01) |
| C22B 3/44 | (2006.01) |

(52) U.S. Cl.
CPC ... *C01D 9/04* (2013.01); *C01F 5/14* (2013.01); *C22B 26/10* (2013.01); *C22B 3/065* (2013.01); *C01F 11/46* (2013.01); *C05C 5/02* (2013.01); *C01F 5/22* (2013.01); *C01D 3/04* (2013.01); *C22B 3/44* (2013.01)
USPC .............................................. 423/395; 71/59

(58) Field of Classification Search
CPC ............ C01B 21/48; C01D 9/00; C01D 9/02; C01D 9/04; C01D 9/06; C01D 9/08; C01D 9/10; C01D 9/12; C01D 9/14; C01D 9/16; C01D 9/18; C01D 9/20; C05C 5/02
USPC ........... 423/170, 194, 395–398; 71/31, 53, 59
See application file for complete search history.

(56) References Cited

U.S. PATENT DOCUMENTS 2,852,340 A * 9/1958 Kippe ........................... 423/162
RE28,655 E 12/1975 Rostrup-Nielsen
(Continued)

FOREIGN PATENT DOCUMENTS

RU 2276123 C2 1/2006

OTHER PUBLICATIONS

Bennett, Richard "Crystallizer Selection and Design," 2002, Elsevier, Second Edition, pp. 115-140.*

(Continued)

*Primary Examiner* — Stanley Silverman
*Assistant Examiner* — Justin Bova
(74) *Attorney, Agent, or Firm* — The Law Office of Michael E. Kondoudis

(57) ABSTRACT

A process for producing KNO3 from polyhalite to is disclosed. In a preferred embodiment, the process comprises steps of (a) contacting polyhalite with $HNO_3$; (b) adding $Ca(OH)_2$ to the solution, thereby precipitating as $CaSO_4$ at least part of the sulfate present in said solution; (c) precipitating as $Mg(OH)_2$ at least part of the $Mg^{2+}$ remaining in said solution by further addition of $Ca(OH)_2$ to the remaining solution; (d) concentrating the solution, thereby precipitating as a sulfate compound at least part of the sulfate remaining in solution; (e) separating at least part of the NaCl from the solution remaining; and (f) crystallizing as solid $KNO_3$ at least part of the $K^+$ and $NO_3^-$ contained in the solution. The process enables direct conversion of polyhalite to $KNO_3$ of purity exceeding 98.5% and that is essentially free of magnesium and sulfate impurities.

21 Claims, 1 Drawing Sheet

(56) References Cited

U.S. PATENT DOCUMENTS

| | | | |
|---|---|---|---|
| 4,246,019 A * | 1/1981 | Sokolov et al. | 71/59 |
| 4,378,342 A | 3/1983 | Manor et al. | |
| 4,776,930 A * | 10/1988 | Bianchi et al. | 423/395 |
| 5,626,825 A * | 5/1997 | Verri | 423/155 |
| 5,846,501 A | 12/1998 | Kremer et al. | |
| 6,267,789 B1 * | 7/2001 | Ninane | 23/303 |

OTHER PUBLICATIONS

International Search Report and Written Opinion dated Nov. 3, 2010 in corresponding International Application No. PCT/IL2010/000514.

* cited by examiner

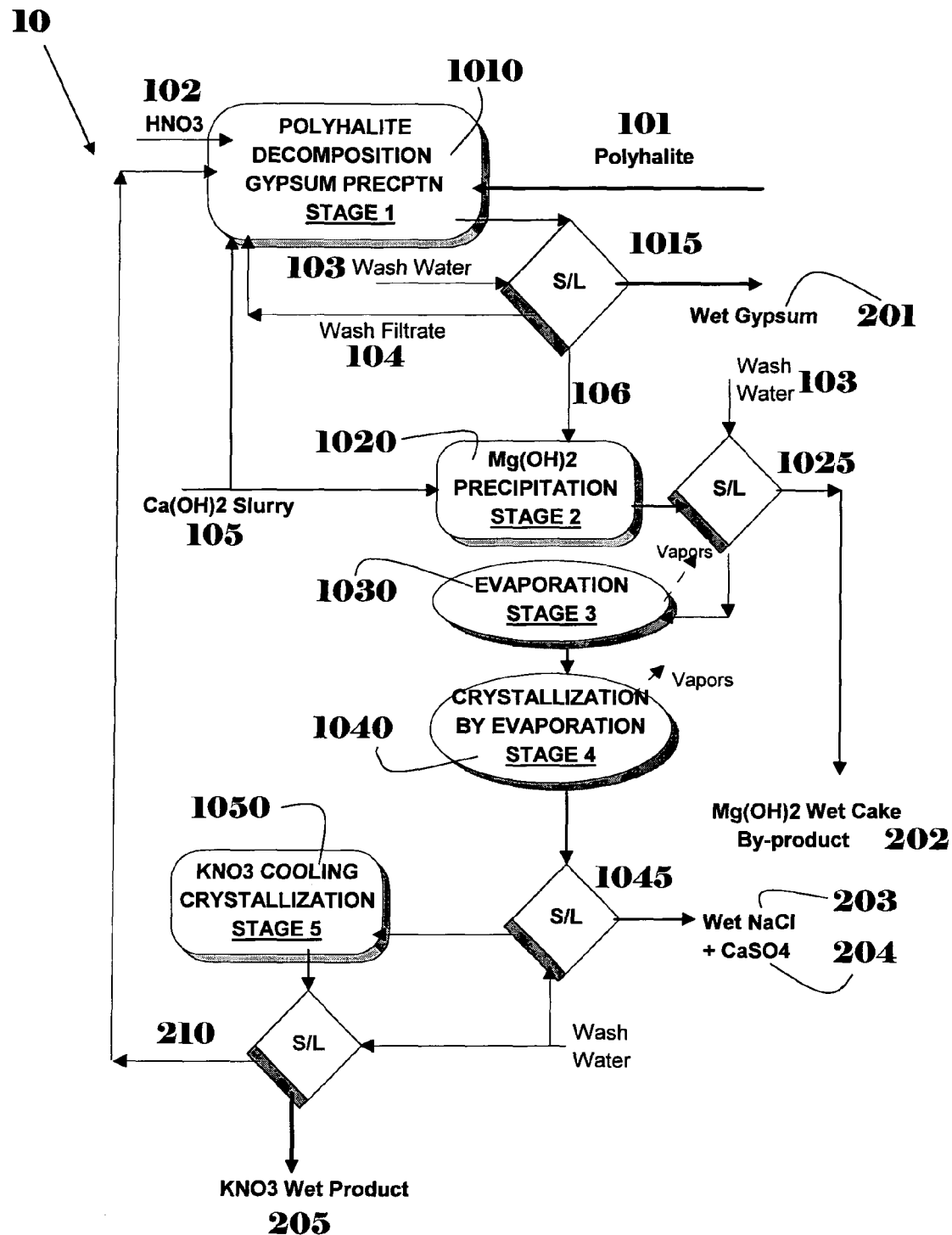

POLYHALITE IMI PROCESS FOR KNO₃ PRODUCTION

REFERENCE TO RELATED PUBLICATION

This application claims priority from U.S. provisional application 61/220,230, dated 25 Jun. 2009, which is hereby incorporated by reference in its entirety.

FIELD OF THE INVENTION

This invention concerns methods for production of $KNO_3$, in particular, methods that use polyhalite as the starting material.

BACKGROUND OF THE INVENTION

Potassium nitrate ($KNO_3$) is a commercially important chemical with uses from explosives to fertilizers. Polyhalite ($K_2SO_4 \cdot MgSO_4 \cdot 2CaSO_4 \cdot 2H_2O$) is a widely-distributed and readily available source of potassium. Reaction of polyhalite with acids (e.g. $HNO_3$) is known in the literature as a means of producing crude salt mixtures containing "complex mineral fertilizer." For example, U.S. Pat. No. 4,246,019 discloses a method for production of a mixture containing 53.54% $KNO_3$, 39.87% $Mg(NO_3)_2$, 5.48% $CaSO_4$, and 1.01% $H_2O$ from the reaction of polyhalite with $HNO_3$. Russian Pat. No. 2,276,123 discloses a method for production of a solution containing a mixture of $K_2SO_4$, $MgSO_4$ and $NH_4NO_3$ from reaction of polyhalite with $HNO_3$ followed by neutralizaion with ammonia. Thus the processes described in the literature allow to produce a solution containing a mixture of substances, including potassium and magnesium nitrates, as well as gypsum that had not been separated in early stages of the process.

Several well-known processes, such as the Southwest Potash and IMI processes, are known for the production of $KNO_3$ by reaction of KCl with $HNO_3$ (*Ullman's Agrochemicals*, vol. 1; Weinheim: Wiley-VCH, 2007, pp. 334-336). Production of essentially pure $KNO_3$ directly from the reaction of polyhalite with strong acid remains unknown, however. Thus, there remains a long-felt need for a process that can produce essentially pure $KNO_3$ from polyhalite without the complications of known processes such as production of complicated product mixtures and necessity of neutralization with ammonia.

SUMMARY OF THE INVENTION

The process disclosed in the present invention produces $KNO_3$ from polyhalite with almost total recovery, without any necessity for preliminary thermal treatment and without the necessity for washing out of NaCl from the polyhalite. The separation of NaCl from the $KNO_3$ is effected by the different temperature dependences of the solubility of the two substances: the solubility of NaCl changes very little with temperature, while that of $KNO_3$ strongly increases with increasing temperature. In the process herein disclosed, Mg is recovered as $Mg(OH)_2$, which is precipitated with lime. The $Mg(OH)_2$ thus recovered can be used directly as a slurry with water, dried or transformed into Mg salts such as $MgSO_4 \cdot H_2O$.

It is therefore an object of the present invention to disclose a process for producing $KNO_3$ wherein the starting material for the process is polyhalite.

It is a further object of the present invention to disclose a process for producing $KNO_3$ from polyhalite, comprising steps of (a) contacting polyhalite with a substance comprising $NO_3^-$; (b) adding at least one inorganic base to the solution obtained in the step of contacting polyhalite with $HNO_3$, thereby precipitating as a solid at least part of the sulfate present in said solution; (c) precipitating as $Mg(OH)_2$ at least part of the $Mg^{2+}$ remaining in said solution by adding at least one basic compound to the remaining solution; (d) concentrating the solution obtained after said step of precipitating at least part of the $Mg^{2+}$ remaining in said solution; (e) precipitating at least part of the NaCl derived from said polyhalite, if any, from the solution obtained after said step of concentrating the solution obtained after said step of precipitating at least part of the $Mg^{2+}$ remaining in said solution; (f) separating said precipitated NaCl, if any, from the reaction stream, and (g) separating as solid $KNO_3$ at least part of the $K^+$ and $NO_3^-$ contained in the solution remaining after the step of precipitating at least part of the NaCl derived from said polyhalite. It is within the essence of the invention wherein said process is adapted to produce commercially usable $KNO_3$ from polyhalite.

It is a further object of this invention to disclose such a process, further including an additional step of washing said polyhalite prior to said step of contacting polyhalite with a substance comprising $NO_3^-$, thereby removing at least a part of the NaCl contained within said polyhalite.

It is a further object of this invention to disclose such a process as defined in any of the above, wherein said step of contacting polyhalite with a substance comprising $NO_3^-$ takes place at a temperature between about 60° C. and about 90° C.

It is a further object of this invention to disclose such a process as defined in any of the above, wherein said substance comprising $NO_3^-$ is chosen from the group consisting of (a) $HNO_3$; (b) $Ca(NO_3)_2$; (c) any combination of the above.

It is a further object of this invention to disclose such a process, wherein said substance comprising $NO_3^-$ is $HNO_3$, and further wherein said step of contacting polyhalite with a substance containing $NO_3^-$ further includes an additional step of contacting polyhalite with a quantity of $HNO_3$ sufficient that the amount of $HNO_3$ in the solution thus obtained is at least 0.5% (w/w).

It is a further object of this invention to disclose such a process, wherein said substance comprising $NO_3^-$ is $HNO_3$, and further wherein said step of contacting polyhalite with a substance containing $NO_3^-$ further includes an additional step of contacting polyhalite with a quantity of $HNO_3$ sufficient that the amount of $HNO_3$ in the solution thus obtained is at least 5% (w/w).

It is a further object of this invention to disclose such a process as defined in any of the above, wherein said step of contacting polyhalite with a substance comprising $NO_3^-$ further includes an additional step of contacting polyhalite with 60% $HNO_3$.

It is a further object of this invention to disclose such a process as defined in any of the above, further including an additional step of recycling into the reaction vessel at least part of the solution remaining after said step of separating solid $KNO_3$.

It is a further object of this invention to disclose such a process, wherein at least a part of said substance comprising $NO_3^-$ is obtained from said solution recycled into said reaction vessel.

It is a further object of this invention to disclose such a process as defined in any of the above, further including an additional step removing from the reaction stream at least part of the solid produced during said step of contacting polyhalite with $HNO_3$.

It is a further object of this invention to disclose such a process, further including an additional step of removing by filtration at least part of the solid produced during said step of contacting polyhalite with $HNO_3$.

It is a further object of this invention to disclose such a process, further including an additional step of washing said solid.

It is a further object of this invention to disclose such a process as defined in any of the above, wherein said step of adding at least one inorganic base to the solution obtained in the step of contacting polyhalite with a substance comprising $NO_3^-$ further includes an additional step of adding at least one inorganic base chosen from the group consisting of $Ca(OH)_2$, $CaCO_3$, and CaO.

It is a further object of this invention to disclose such a process as defined in any of the above, wherein said wherein said step of adding at least one inorganic base to the solution obtained in the step of contacting polyhalite with a substance comprising $NO_3^-$ further includes an additional step of adding sufficient inorganic base to reduce substantially the $SO_4^{2-}$ content of said solution.

It is a further object of this invention to disclose such a process as defined in any of the above, wherein said step of adding at least one inorganic base to the solution obtained in the step of contacting polyhalite with a substance comprising $NO_3^-$ further includes an additional step of adding sufficient inorganic base to reduce the $SO_4^{2-}$ content of said solution by at least 85%.

It is a further object of this invention to disclose such a process, wherein said inorganic base is chosen from the group consisting of (a) basic Ca compounds; (b) basic Ba compounds; (c) any combination of the above.

It is a further object of this invention to disclose such a process as defined in any of the above, further including an additional step of removing from the reaction stream at least part of the insoluble sulfate produced during said step of contacting polyhalite with $HNO_3$.

It is a further object of this invention to disclose such a process as defined in any of the above, further including an additional step of separating by filtration at least part of the insoluble sulfate produced during said step of contacting polyhalite with $HNO_3$.

It is a further object of this invention to disclose such a process as defined in any of the above, wherein said step of precipitating as $Mg(OH)_2$ at least part of the $Mg^{2+}$ remaining in said solution further comprises an additional step of adding a sufficient amount of at least one basic Ca compound to precipitate more than 50% of the $Mg^{2+}$ remaining in said solution as $Mg(OH)_2$.

It is a further object of this invention to disclose such a process as defined in any of the above, wherein said step of precipitating as $Mg(OH)_2$ at least part of the $Mg^{2+}$ remaining in said solution further comprises an additional step of adding a sufficient amount of at least one basic Ca compound to precipitate more than 85% of the $Mg^{2+}$ remaining in said solution as $Mg(OH)_2$.

It is a further object of this invention to disclose such a process as defined in any of the above, wherein said step of precipitating as $Mg(OH)_2$ at least part of the $Mg^{2+}$ remaining in said solution further comprises an additional step of adding at least one basic Ca compound chosen from the group consisting of $Ca(OH)_2$ and CaO.

It is a further object of this invention to disclose such a process as defined in any of the above, further including an additional step of removing from the reaction stream at least part of said $Mg(OH)_2$ obtained in said step of precipitating as $Mg(OH)_2$ at least part of the $Mg^{2+}$ remaining in said solution.

It is a further object of this invention to disclose such a process, further including an additional step of washing said $Mg(OH)_2$.

It is a further object of this invention to disclose such a process, wherein said $Mg(OH)_2$ is at least 92% pure.

It is a further object of this invention to disclose such a process as defined in any of the above, wherein said step of concentrating the solution remaining after said step of precipitating at least part of the $Mg^{2+}$ remaining in said solution further comprises a step chosen from the group consisting of (a) using a multiple effect evaporator to concentrated said solution and (b) concentrating said solution by mechanical vapor recompression.

It is a further object of this invention to disclose such a process as defined in any of the above, wherein said step of precipitating at least part of the NaCl further includes an additional step of precipitating NaCl by evaporative crystallization.

It is a further object of this invention to disclose such a process, wherein said step of precipitating NaCl by evaporative crystallization occurs at a temperature exceeding about 60° C.

It is a further object of this invention to disclose such a process as defined in any of the above, wherein said step of separating as solid $KNO_3$ at least part of the $K^+$ and $NO_3^-$ contained in the solution remaining after said step of adding a basic Ca compound further includes an additional step of crystallizing $KNO_3$ from said solution.

It is a further object of this invention to disclose such a process, wherein said step of crystallizing $KNO_3$ from said solution further includes an additional step of cooling said solution in order to affect crystallization of $KNO_3$.

It is a further object of this invention to disclose such a process, wherein said step of cooling said solution includes a further step of cooling said solution to a temperature below 40° C.

It is a further object of this invention to disclose such a process as defined in any of the above, further including an additional step of purifying said $KNO_3$ obtained in said step of separating $KNO_3$.

It is a further object of this invention to disclose such a process, wherein said step of purifying said $KNO_3$ further includes an additional step of purifying said $KNO_3$ by at least one method chosen from the group consisting of (a) washing said $KNO_3$; (b) pulping with a substantially pure $KNO_3$ solution; and (c) recrystallization.

It is a further object of this invention to disclose such a process as defined in any of the above, wherein the purity of said $KNO_3$ exceeds 98.5%.

It is a further object of this invention to disclose such a process as defined in any of the above, wherein said step of precipitating at least part of the $Mg^{2+}$ is carried out prior to said step of separating $KNO_3$.

It is a further object of this invention to disclose such a process as defined in any of the above, wherein said step of precipitating at least part of the $Mg^{2+}$ is carried out subsequent to said step of separating $KNO_3$.

BRIEF DESCRIPTION OF THE FIGURE

FIG. 1 shows a schematic flowchart of the process herein disclosed.

DETAILED DESCRIPTION OF THE PREFERRED EMBODIMENTS

The present invention is described hereinafter with reference to the drawings and examples, in which preferred embodiments are described. For the purposes of explanation, specific details are set forth in order to provide a thorough understanding of the invention. It will be apparent to one skilled in the art that there are other embodiments of the invention that differ in details without affecting the essential nature thereof. Therefore the invention is not limited by that which is illustrated in the figures and described in the specification, but only as indicated in the accompanying claims, with the proper scope determined only by the broadest interpretation of said claims.

In the detailed description that follows, formulas indicating water of hydration are given according to conventional literature practice. As such, no claims are made regarding the specific level of hydration of the compounds (including those for which no water of hydration is indicated explicitly), and the invention herein disclosed is not limited to the specific levels of hydration given.

The fundamental chemistry involved in the process herein disclosed can be summarized as follows:

$$K_2SO_4 \cdot MgSO_4 \cdot 2CaSO_4 \cdot 2H_2O + 2HNO_3 + 4H_2O + Ca(OH)_2 [+Ca(NO_3)_2] \rightarrow 2KNO_3 + Mg(NO_3)_2 + 4(CaSO_4 \cdot 2H_2O)$$

The $Mg(NO_3)_2$ produced is precipitated as $Mg(OH)_2$ by further reaction with $Ca(OH)_2$:

$$Mg(NO_3)_2 + Ca(OH)_2 \rightarrow Mg(OH)_2 + Ca(NO_3)_2$$

In the present invention, in contrast to methods known in the art, nitrate ion and calcium ion are added in separate independent steps of the process. In some embodiments of the process, $Ca(NO_3)_2$ recovered from later stages of the process is recycled and reacted with the polyhalite.

In a preferred embodiment of the invention herein disclosed, the following series of steps is employed to produce a commercial grade of $KNO_3$ from the reaction of polyhalite with $HNO_3$. The various "stages" are listed with reference to the schematic flowchart given in FIG. 1 for a preferred embodiment 10 of the invention herein disclosed.

In some embodiments of the invention, NaCl is washed from the polyhalite. This step is entirely optional; there is no requirement to wash out the NaCl from the polyhalite, nor is there any need for preliminary thermal treatment of the polyhalite.

In Stage 1 of the process (1010), polyhalite 101 is contacted with a substance comprising $NO_3^-$ 102. In preferred embodiments, substance 102 is $HNO_3$; in most preferred embodiments, the $HNO_3$ is provided in 60% concentration. In preferred embodiments of the invention, a sufficient amount of 60% $HNO_3$ is added such that concentration of $HNO_3$ in the resulting solution (i.e. including the polyhalite) is at least 5% (w/w). In preferred embodiments of the invention, the polyhalite and $HNO_3$ are brought into contact at a temperature of between about 60° C. and about 90° C. In other embodiments of the invention, temperatures outside of the range used in preferred embodiments are used. In other embodiments, substance 102 may comprise another nitrate salt such as $Ca(NO_3)_2$, or a mixture of a nitrate salt and $HNO_3$. In typical embodiments in which $Ca(NO_3)_2$ is used, it is added at the beginning of stage 1 in addition to or instead of the $HNO_3$ added at the beginning of the stage and the Ca compound added at the end of this stage, described below.

In preferred embodiments of the invention, at least part of the solution (210) obtained in stage 5 (described below) is recycled into the reaction vessel in which the contact between polyhalite and the substance comprising $NO_3^-$ takes place.

The reaction mixture is then brought into contact with a base (in preferred embodiments, a $Ca(OH)_2$ slurry (105)); in preferred embodiments, sufficient slurry is added to bring the pH to substantially neutral. Addition of the $Ca(OH)_2$ slurry thereby yields a solution comprising primarily $K^+$, $Mg^{2+}$, $Ca^{2+}$, $Na^+$, $NO_3^-$, and $Cl^-$, along with solid $CaSO_4$ (gypsum). In preferred embodiments, sufficient base is added to precipitate at least 85% of the $SO_4^-$ present in the solution.

In preferred embodiments of the invention, solid gypsum precipitated during the reaction between the polyhalite and the $HNO_3$ is filtered and washed with wash water 103 (in preferred embodiments, by counter-current washing on a filter 1015) in order to reduce the nitrate content. The mother liquor (106) is transferred to stage 2, while the wet gypsum after washing (201) is discharged from the system. The wash filtrate 104 is then returned to the reaction vessel in which stage 1 takes place.

In Stage 2 of the process (1020), additional $Ca(OH)_2$ slurry (105) is added to the solution obtained in Stage 1 (106) after removal of solid gypsum in order to precipitate the major part of the $Mg^{2+}$ contained in the solution as $Mg(OH)_2$ (202); in preferred embodiments, sufficient $Ca(OH)_2$ is added to precipitate at least 50% of the $Mg^{2+}$ present. The $Mg(OH)_2$ is washed (1025) and removed. After precipitation of $Mg(OH)_2$, a solution comprising primarily $Ca^{2+}$, $K^+$, $Na^+$, $NO_3^-$, $Cl^-$ and residual $Mg^{2+}$ remains. In some embodiments, this stage is carried out after Stage 5 (described below) on the solutions to be recycled in stage 1. The chemical purity of the $Mg(OH)_2$ produced is dependent on the purity of the CaO or $Ca(OH)_2$ used. In preferred embodiments, $Mg(OH)_2$ with a purity exceeding 92% is obtained.

The process then proceeds to Stage 3 (1030), in which the solution obtained in Stage 2 is concentrated. In preferred embodiments, the concentration is effected by evaporation using any technique known in the art, e.g., a multiple effect evaporator or by mechanical vapor recompression. In a preferred embodiment, at least part of the residual $CaSO_4$ thus precipitated is separated from the supernatant solution at the exit of the vessel in which the concentration takes place. The evaporation can be also carried out by solar evaporation in an evaporation pond and thus the calcium sulfate precipitated can be left on the bottom of the pond.

The process then continues to Stage 4 (1040), in which NaCl (203) and a small part of the $CaSO_4$ (204) present in the solution are partially separated from the solution remaining after Stage 3 by crystallization in an evaporative crystallizer at a temperature exceeding 60° C. The solids are separated (in preferred embodiments, by filtration 1045) and removed.

In Stage 5 of the process (1050), $KNO_3$ is crystallized from the solution by cooling the solution remaining from Stage 4. The crystallization can be carried out by any technique known in the art, e.g., in a cooling crystallizer of the various types existing, including cooling disc crystallizer. In typical embodiments of the invention, the purity of the white $KNO_3$ product obtained after washing in the tests exceeds 98.5%. In typical embodiments of the invention, the main impurities are Ca (<0.2%), (<1000 ppm); Na (~500 ppm); $SO_4^{2-}$ (~200 ppm); Mg (~10 ppm); and Sr (~10 ppm). The $KNO_3$ thus produced can be further purified by any technique known in the art, for example, by repulping with a pure $KNO_3$ solution or by recrystallization.

The solution 210 remaining from Stage 5 is recycled to the vessel in which Stage 1 takes place. The $Ca(NO_3)_2$ contained in the solution remaining from Stage 5 reacts with the sulfate in the solution in stage 1 to precipitate gypsum.

EXAMPLE 1

Polyhalite (unwashed, crushed and screened to −0.5 mm, 400 g) was added to a stirred mixture of nitric acid (59%, 146.7 g) and recycled solution (1090 g, made from combining mother liquor from $KNO_3$ crystallization presented in Example 3 and gypsum wash water from a previous batch). The concentration of the nitric acid is modified by dilution with wash water from previous runs in order to maintain a constant nitrate concentration of 15-16% in the final filtrate. The reaction mixture was heated to 65° C. and stirred for 3 h. After that time, milk of lime (169.4 g, 30% in water) was added dropwise via pump over a 1 h period to the hot mixture in order to neutralize the acidity of the slurry. When the mixture reached pH of 5.5-6.5 the addition was stopped and the mixture was filtered while hot under vacuum. The gypsum cake (700 g, 60.8% solids) was then washed with water (3×350 g) so that the nitrate content of the cake was satisfactorily low. The wet, washed gypsum (575.6 g, 73.9% solids) was then dried overnight in an oven at 60° C. yielding 425.5 g of gypsum ($CaSO_4.2H_2O$>98.5%, K<0.4%, Mg<0.2%, $NO_3^-$<100 ppm). The filtrate (1094.7 g, K=4.7%, Mg=1.5%, Ca=0.6%, $SO_4^{2-}$=0.3%, $NO_3^-$=15.5%) was used as the basis for the $Mg(OH)_2$ separation step (see Example 2 below) while the wash water was combined with the recycled solution for the next batch.

EXAMPLE 2

A sample of solution obtained after completion of the reaction presented in Example 1 above (720-900 g of solution were treated at a temperature of 60-70° C. with 15% solution of milk of lime (300 g). As a result of this treatment, the Mg concentration decreased from 1.5% to less than 0.2%. The solids precipitated were settled and, afterwards, filtered and washed. The dry solids contained more than 92% $Mg(OH)_2$. The main impurities were Ca (<5%), $SO_4^=$ (2%), $NO_3^-$ (0.2%) and $Cl^-$ (0.05%).

EXAMPLE 3

A sample of the solution of remaining after the precipitation of $Mg(OH)_2$ described in Example 2 above, comprising (concentrations on w/w basis relative to the total solution) 2.2% Ca, 4.4% K, 1.9% Na, 0.01% Mg, 13.3% $NO_3^-$, 3.1% $Cl^-$, and 0.08% $SO_4^{2-}$ was concentrated by evaporation at a temperature exceeding 80° C. The total concentration of dissolved salts increased by >80% as a result of the concentration. The NaCl thus crystallized was separated at a temperature exceeding 80° C. and its purity after washing exceeded 98%.

The remaining solution was then cooled down to a temperature <40° C., leading to precipitation of $KNO_3$, which was then separated from the mother liquor and washed. Rhe purity of the $KNO_3$ obtained exceeded 99.5%, while the concentration of dissolved salts in the mother solution to be recycled to the reaction was in the range of 55-60%.

We claim:

1. A process for producing solid $KNO_3$ of at least 98.5% purity from polyhalite, said polyhalite containing NaCl as an impurity, wherein said process comprises:
   contacting polyhalite with a substance comprising $NO_3^-$;
   adding at least one inorganic base to the solution obtained in the step of contacting polyhalite with a substance comprising $NO_3^-$, thereby precipitating as a solid at least part of the sulfate present in said solution;
   precipitating as $Mg(OH)_2$ at least part of the $Mg^{2+}$ remaining in said solution by adding at least one basic compound to the remaining solution;
   concentrating a solution obtained after said step of precipitating at least part of the $Mg^{2+}$ remaining in said solution;
   precipitating at least part of said NaCl from the solution obtained after said concentrating;
   separating solid NaCl obtained in said step of precipitating at least part of said NaCl;
   separating as a quantity of solid $KNO_3$ at least part of $K^+$ and $NO_3^-$ contained in the solution remaining after the step of precipitating at least part of said NaCl; and,
   recycling into the reaction vessel at least part of the solution remaining after said separating as a quantity of solid $KNO_3$ at least part of said $K^+$ and $NO_3^-$.

2. The process according to claim 1, wherein said step of contacting polyhalite with a substance comprising $NO_3^-$ takes place at a temperature between about 60° C. and about 90° C.

3. The process according to claim 1, wherein said substance comprising $NO_3^-$ is selected from the group consisting of (a) $HNO_3$; (b) $Ca(NO_3)_2$; and (c) any combination thereof.

4. The process according to claim 3, wherein said substance comprising $NO_3^-$ is $HNO_3$, and further wherein said step of contacting polyhalite with a substance containing $NO_3^-$ comprises contacting polyhalite with a quantity of $HNO_3$ sufficient that the amount of $HNO_3$ in the solution thus obtained is at least 5% (w/w).

5. The process according to claim 1, wherein said step of contacting polyhalite with a substance comprising $NO_3^-$ comprises contacting polyhalite with 60% $HNO_3$.

6. The process according to claim 1, wherein said step of recycling into the reaction vessel at least a part of the solution remaining after said step of separating solid $KNO_3$ comprises recycling into said reaction vessel a solution comprising $NO_3^-$.

7. The process according to claim 1, further comprising removing at least part of the solid produced during said step of adding at least one inorganic base to the solution.

8. The process according to claim 1, wherein said step of adding at least one inorganic base to the solution obtained in the step of contacting polyhalite with a substance comprising $NO_3^-$ comprises adding at least one inorganic base selected from the group consisting of $Ca(OH)_2$, $CaCO_3$, and CaO.

9. The process according to claim 1, wherein said step of adding at least one inorganic base to the solution obtained in the step of contacting polyhalite with a substance comprising $NO_3^-$ comprises adding sufficient inorganic base to reduce the $SO_4^{2-}$ content of said solution by at least 85%.

10. The process according to claim 1, further comprising removing at least part of the insoluble sulfate produced during said step of adding at least one inorganic base to the solution.

11. The process according to claim 1, wherein said step of precipitating as $Mg(OH)_2$ at least part of the $Mg^{2+}$ remaining in said solution further comprises adding a sufficient amount of at least one basic Ca compound to precipitate more than 85% of the $Mg^{2+}$ remaining in said solution as $Mg(OH)_2$.

12. The process according to claim 1, wherein said step of precipitating as $Mg(OH)_2$ at least part of the $Mg^{2+}$ remaining in said solution further comprises adding at least one basic Ca compound selected from the group consisting of $Ca(OH)_2$ and CaO.

13. The process according to claim 1, further comprising recovering at least part of said $Mg(OH)_2$ obtained in said step of precipitating as $Mg(OH)_2$ at least part of the $Mg^{2+}$ remaining in said solution.

14. The process according to claim 13, further comprising washing the $Mg(OH)_2$ recovered in said step of recovering at least part of said $Mg(OH)_2$.

15. The process according to claim 13, wherein said recovered Mg(OH)$_2$ is at least 92% pure.

16. The process according to claim 1, wherein said step of concentrating the solution remaining after said step of precipitating at least part of the Mg$^{2+}$ remaining in said solution comprises a step selected from the group consisting of (a) using a multiple effect evaporator to concentrate said solution and (b) concentrating said solution by mechanical vapor recompression.

17. The process according to claim 1, wherein said step of precipitating at least part of said NaCl comprises precipitating NaCl by evaporative crystallization.

18. The process according to claim 1, wherein said step of separating as a quantity of solid KNO$_3$ at least part of the K$^+$ and NO$_3^-$ contained in the solution remaining after said step of precipitating at least part of said NaCl comprises crystallizing KNO$_3$ from said solution.

19. The process according to claim 1, further comprising purifying said KNO$_3$ obtained in said step of separating KNO$_3$.

20. The process according to claim 1, wherein said process does not comprise any step of washing out of NaCl from said polyhalite.

21. The process according to claim 1, wherein said process does not comprise any preliminary thermal treatment of said polyhalite.

* * * * *